(12) United States Patent
Robinson et al.

(10) Patent No.: US 9,882,638 B2
(45) Date of Patent: Jan. 30, 2018

(54) OPTICAL RECEIVER SIGNAL STRENGTH INDICATOR (RSSI) CIRCUIT HAVING A VARIABLE SUPPLY VOLTAGE FILTER IMPEDANCE

(71) Applicant: Avago Technologies General IP (Singapore) Pte. Ltd., Singapore (SG)

(72) Inventors: Michael A. Robinson, Freemont, CA (US); Sunil Priyadarshi, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 152 days.

(21) Appl. No.: 14/810,534

(22) Filed: Jul. 28, 2015

(65) Prior Publication Data

US 2017/0033867 A1 Feb. 2, 2017

(51) Int. Cl.
H04B 17/00 (2015.01)
H04B 10/079 (2013.01)
H04B 10/69 (2013.01)

(52) U.S. Cl.
CPC ... *H04B 10/07955* (2013.01); *H04B 10/0799* (2013.01); *H04B 10/69* (2013.01)

(58) Field of Classification Search
CPC .............................................. H04B 10/07955
See application file for complete search history.

(56) References Cited

U.S. PATENT DOCUMENTS

| | | | | |
|---|---|---|---|---|
| 4,415,803 A | * | 11/1983 | Muoi | H03F 1/08 250/214 A |
| 5,361,156 A | * | 11/1994 | Pidgeon | H04B 10/2507 398/193 |
| 6,104,919 A | * | 8/2000 | Lyall, Jr. | H03G 3/3052 330/149 |
| 6,307,196 B1 | * | 10/2001 | Thompson | G01J 1/44 250/214 A |
| 6,778,021 B2 | | 8/2004 | Denoyer et al. | |
| 7,050,724 B1 | | 5/2006 | Rantakari | |
| 8,492,700 B2 | * | 7/2013 | Fattal | H04B 10/691 250/214 R |
| 8,901,474 B2 | | 12/2014 | Azadeh | |
| 2013/0259471 A1 | | 10/2013 | Wang | |
| 2014/0306760 A1 | * | 10/2014 | Piepenstock | H03G 1/007 330/261 |
| 2015/0155951 A1 | * | 6/2015 | Noda | H03G 3/3084 398/202 |

* cited by examiner

*Primary Examiner* — Tesfaldet Bocure

(57) ABSTRACT

An optical receiver signal strength indicator (RSSI) circuit for use in an optical receiver or transceiver module is provided that uses a variable impedance device in the supply voltage filter circuit. The variable impedance device is varied based on the strength of the input current signal produced by the photodiode. At lower values of input current, the variable impedance is increased to improve the accuracy with which the RSSI circuit senses the input current, which improves the accuracy of the RSSI signal output from the RSSI circuit. The increase in impedance also improves supply voltage filtering by reducing the low-pass bandwidth of the supply voltage filter circuit. At higher values of input current, the variable impedance is decreased to ensure that the voltage bias applied to the photodiode is at least equal to a minimum bias voltage needed for proper operation of the photodiode.

21 Claims, 4 Drawing Sheets

OPTICAL RECEIVER SIGNAL STRENGTH INDICATOR (RSSI) CIRCUIT HAVING A VARIABLE SUPPLY VOLTAGE FILTER IMPEDANCE

TECHNICAL FIELD

The invention relates to optical communications modules. More particularly, the invention relates to an optical receiver signal strength indicator (RSSI) circuit for use in optical communications modules.

BACKGROUND

A variety of optical communications modules exist for transmitting and/or receiving optical data signals over optical waveguides (e.g., optical fibers). Optical communications modules include optical receiver, optical transmitter and optical transceiver modules. Optical receiver modules have one or more receive channels for receiving one or more optical data signals over one or more respective optical waveguides. Optical transmitter modules have one or more transmit channels for transmitting one or more optical data signals over one or more respective optical waveguides. Optical transceiver modules have one or more transmit channels and one or more receive channels for transmitting and receiving respective optical transmit and receive data signals over respective transmit and receive optical waveguides. For each of these different types of optical communications modules, a variety of designs and configurations exist.

In optical receiver and transceiver modules, an optical data signal passing out of an end of an optical fiber is coupled by an optics system onto an optical detector, such as a P-intrinsic-N (PIN) diode or other type of photodiode. The photodiode converts the optical data signal into an electrical current signal, which is then converted into an electrical voltage signal, amplified and processed to recover the data. The current-to-voltage conversion and amplification processes are typically performed by a transimpedance amplifier (TIA) circuit.

In many cases, it is desirable or necessary to provide an indicator signal that is indicative of the optical power level of the incident light striking the photodiode. The indicator signal is typically referred to as a receiver signal strength indicator (RSSI) signal, and the signal may be either an analog or digital signal and may or may not be amplified. Known RSSI circuits exist for determining the optical power level of the incident light based on a measurement of the electrical current produced by the photodiode.

A typical RSSI circuit includes a filter circuit for filtering out high frequency noise applied to the photodiode by the supply voltage. The filter circuit typically includes a resistor and a capacitor connected in series. By sensing the voltage across the resistor, the input current signal output by the photodiode to the RSSI circuit is sensed. The input current signal is proportional to the input optical power, i.e., the optical power level of the light striking the photodiode. Hence, the RSSI circuit detects the input optical power.

FIG. 1 illustrates a block diagram of a typical RSSI circuit 1 for generating an electrical current signal proportional to the photocurrent produced by a photodiode 2 when light strikes the photodiode 2. The cathode of the photodiode 2 is connected to a supply voltage filter circuit comprising a first resistor, R1, 3 and a capacitor, $C_{FLT}$, 4. The anode of the photodiode 2 is connected to an input of a TIA 6. The supply voltage filter circuit acts as a low-pass filter that removes high frequency noise from the supply voltage, $V_{CC}$. The input current, $I_{PIN}$, produced by the photodiode 2 flows through resistor R1 3, which generates a time-varying voltage signal that is dependent on $I_{PIN}$. Because the RC time constant associated with R1 and $C_{FLT}$ is much larger than the data rate of the RSSI circuit 1, the voltage, V1, across R1 varies very little with time and is therefore useful in tracking the average input current, which is calculated as V1/R1.

An operational amplifier (op-amp) 5, a second resistor, R2, 7 and a p-type metal oxide semiconductor transistor (PMOS) 8 are used to generate an output current, $I_{OUT}$, proportional to the average input current $I_{PIN}*(R1/R2)$, where the symbol "*" represents a multiplication operation. The RSSI circuit 1 will force the same voltage V1 that is across R1 to be across R2, creating a current in R2 equal to V1/R2 that flows in and out of the PMOS 8 and into an appropriate load 9 having a load impedance, $Z_{LOAD}$. The output current, $I_{OUT}$, which equals $I_{PIN}*(R1/R2)$, is normally considered the RSSI signal and this signal is typically used by other circuitry (not shown) to monitor the optical power level of the photodiode 2. In some cases, the RSSI signal is amplified and/or digitized.

With RSSI circuits having the configuration shown in FIG. 1, the voltage bias from the supply voltage $V_{CC}$ that is applied to the photodiode 2 must be kept above a minimum value in order for the photodiode 2 to operate properly. This minimum voltage value for the photodiode 2 limits the allowed voltage drop V1 across R1, which constrains the value of R1 to a small value. If the value of R1 is too large, the voltage drop V1 will not be sufficiently below $V_{CC}$ to ensure that the voltage bias applied to the photodiode 2 is large enough for it to operate properly. Therefore, when using the RSSI circuit configuration shown in FIG. 1, the value of R1 must be chosen so that it is small enough to support maximum current flow and to maintain a voltage level across R1 that is sufficiently below $V_{CC}$. On the other hand, a large value for R1 is desired in order to reduce the low-pass bandwidth of the filter circuit and to provide a signal that is sufficiently large to allow accurate sensing of the input current signal.

Accordingly, a need exists for an RSSI circuit that ensures that the impedance of the supply voltage filter circuit is small enough that the photodiode has adequate voltage to operate properly and large enough to ensure accurate sensing of the input current signal and effective supply voltage filtering.

DETAILED DESCRIPTION OF ILLUSTRATIVE EMBODIMENTS

Figure 1:
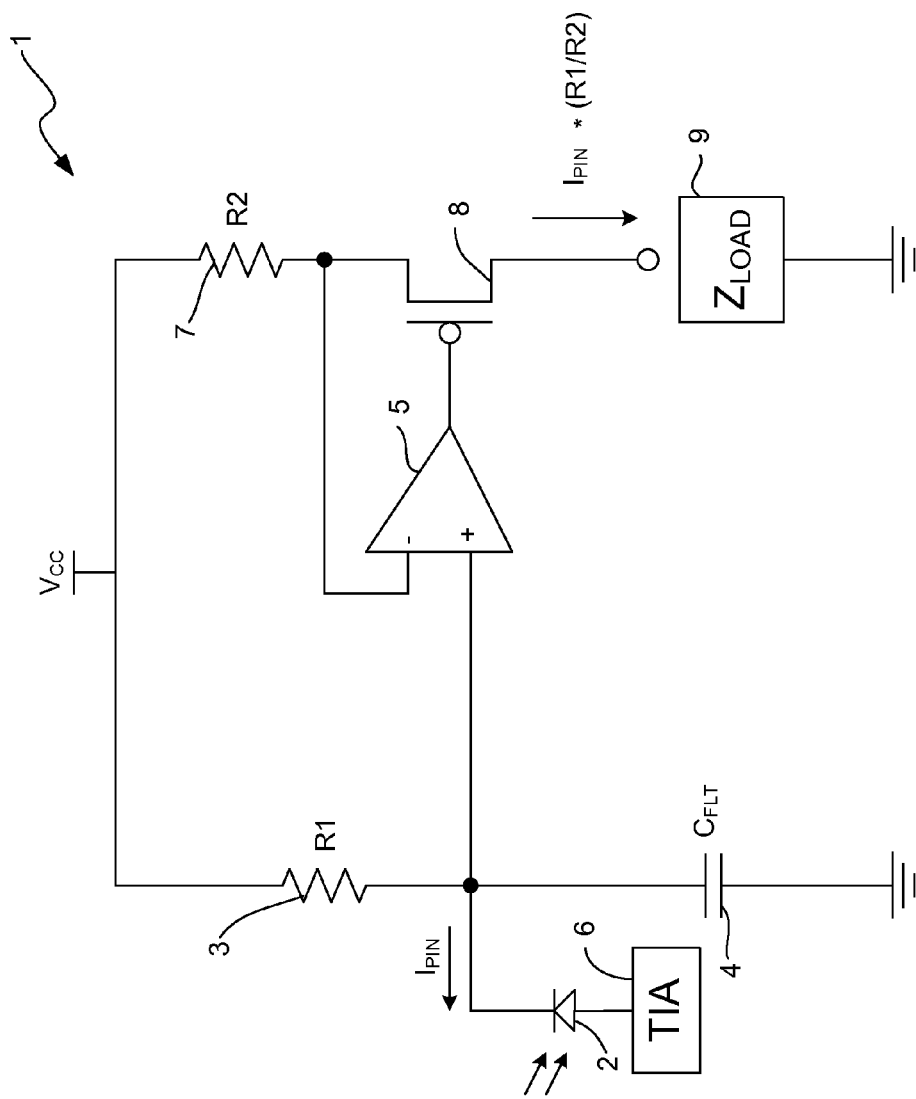
FIG. 1 illustrates a block diagram of a known RSSI circuit for generating an RSSI signal proportional to a photocurrent produced by a photodiode.

In accordance with illustrative, or exemplary, embodiments described herein, an RSSI circuit for use in an optical receiver or transceiver module is provided that uses a variable impedance device in the supply voltage filter circuit. The variable impedance device has an impedance value that is varied based directly or indirectly on the strength of the input current signal produced by the photodiode. At lower values of input current (signal is weak), the variable impedance is increased to improve the accuracy with which the RSSI circuit senses the input current, which improves the accuracy of the RSSI signal output from the RSSI circuit. The increase in impedance also improves supply voltage filtering by reducing the low-pass bandwidth of the supply voltage filter circuit. At higher values of input current (signal is strong), the variable impedance is decreased to ensure that the voltage bias applied to the photodiode is at least equal to a minimum bias voltage needed for proper operation of the photodiode. Illustrative, or exemplary, embodiments of the RSSI circuit will now be described with reference to FIGS. 2-4, in which like reference numerals represent like components, elements or features.

Figure 2:
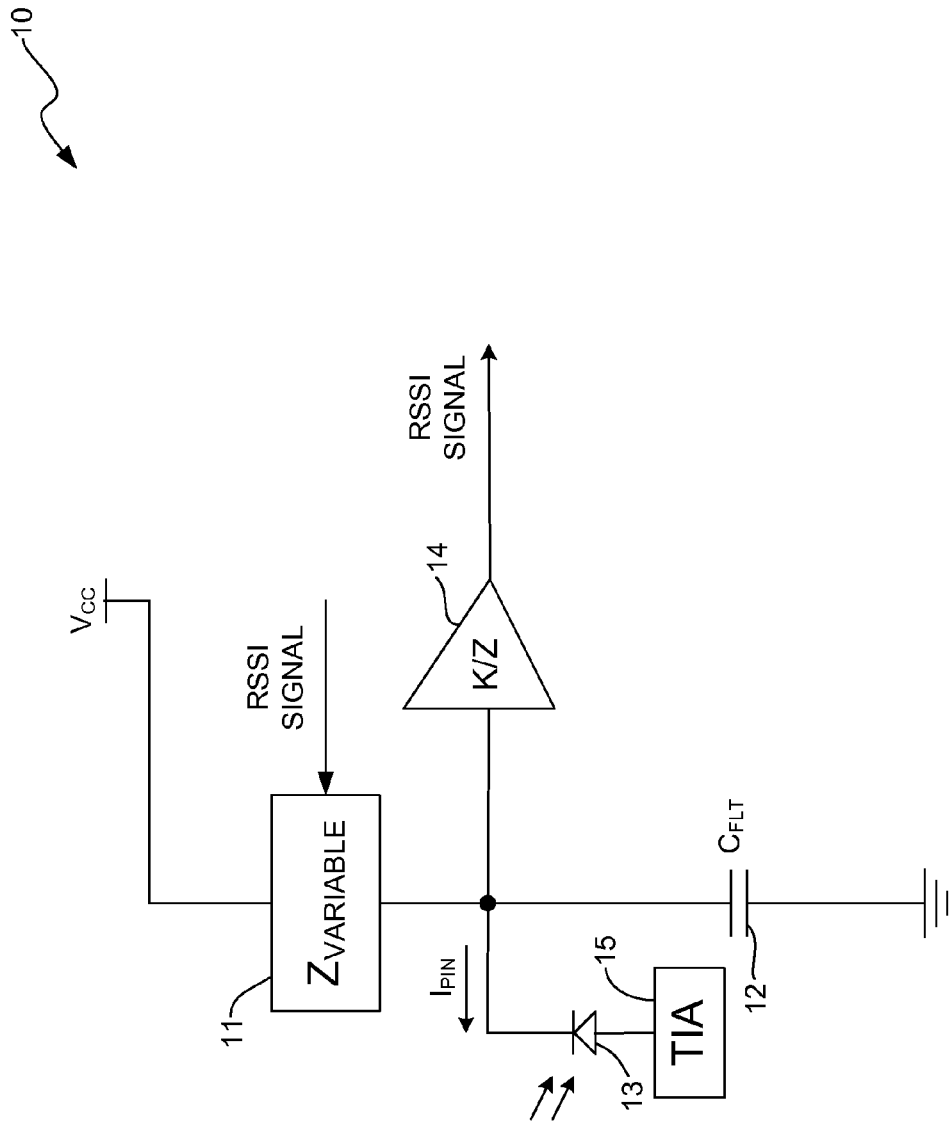
FIG. 2 illustrates a block diagram of an RSSI circuit in accordance with an illustrative embodiment.

FIG. 2 illustrates a block diagram of an RSSI circuit 10 in accordance with an illustrative embodiment that includes a variable impedance device having an impedance value that is varied based on the value of the RSSI signal produced by the RSSI circuit 10. The RSSI circuit 10 includes a supply voltage filter circuit that comprises a variable impedance device 11 and a filter capacitor, $C_{FLT}$, 12. The anode of a photodiode 13 is electrically coupled to an input of a TIA 15 and the cathode of the photodiode 13 is electrically coupled to the variable impedance device 11 and to an input of an amplifier 14. The TIA 15 is a conventional circuit of an optical receiver and therefore, in the interest of brevity, will not be described herein. The input current $I_{PIN}$ from the photodiode 13 flows through the variable impedance device 11 and causes a voltage across the variable impedance device 11 to be generated. The difference between this voltage and $V_{CC}$ is then amplified by amplifier 14 by a gain of K/Z, where K is a numerical constant and Z is the present impedance value of the variable impedance device 11. The output of the amplifier 14 is the RSSI signal, which is proportional to $I_{PIN}$. The RSSI signal is provided to the variable impedance device 11. For higher values of $I_{PIN}$, the RSSI signal value is also higher, which causes the impedance value of the variable impedance device 11 to be reduced. For lower values of $I_{PIN}$, the RSSI signal value is also lower, which causes the impedance value of the variable impedance device 11 to be increased.

Figure 3:
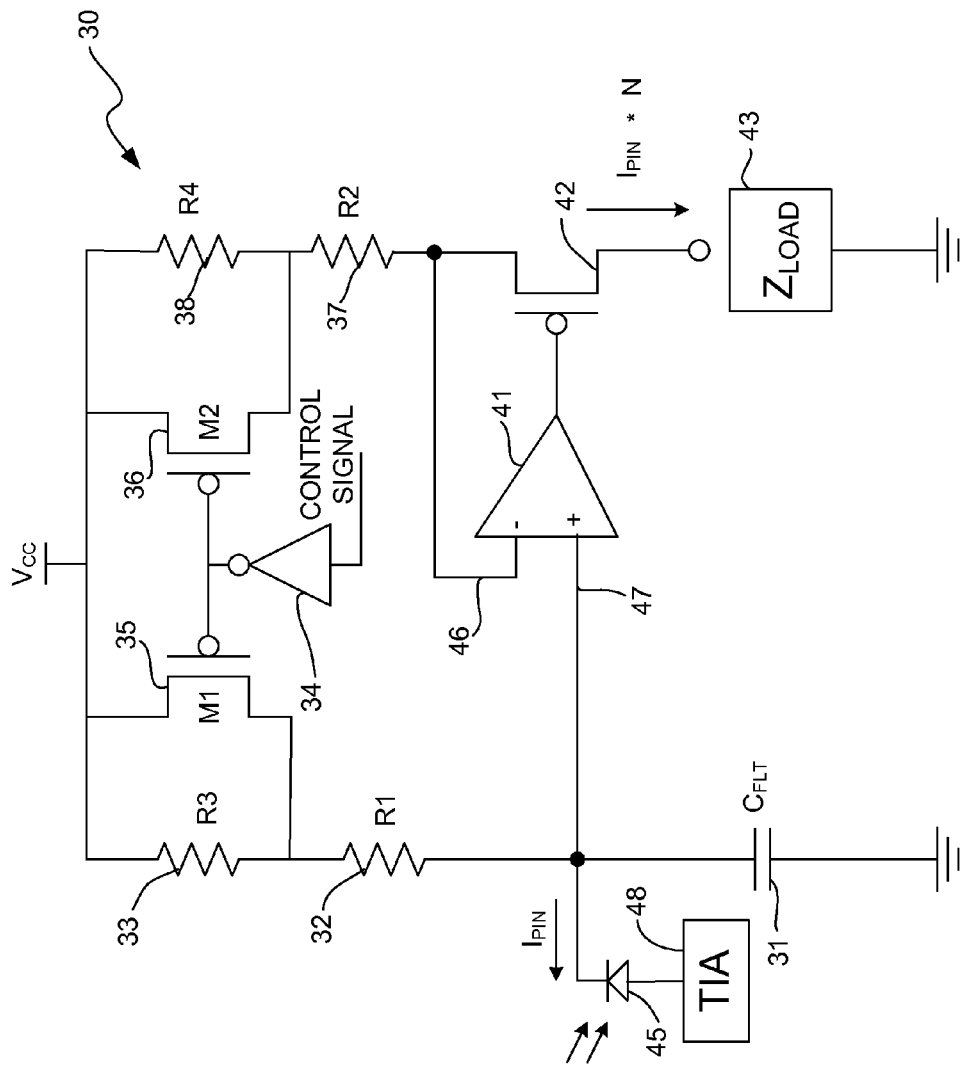
FIG. 3 illustrates a block diagram of an RSSI circuit in accordance with another illustrative embodiment.

FIG. 3 illustrates an RSSI circuit 30 in accordance with another illustrative embodiment. The RSSI circuit 30 includes a supply voltage filter circuit that comprises a capacitor $C_{FLT}$ 31, resistors R1 32 and R3 33, and a first PMOS M1 35. A control circuit 34 controls the activation and deactivation of the first PMOS M1 35 and of a second PMOS M2 36. The network comprising PMOS M2 36 and resistors R2 37 and R4 38 is a scaled replica of the network comprising PMOS M1 35 and resistors R1 32 and R3 33. In this RSSI circuit 30, R1/R2=R3/R4=(width/length (W/L) of M2)/(W/L of M1)=N, and therefore the overall impedance of the replica network is scalable by a factor of 1/N. The op-amp 41 and the PMOS 42 force the same voltage drop across both of the networks. Hence, the resulting output current signal, $I_{OUT}$, will be equal to $I_{PIN}*N$. The current that passes into and out of the PMOS 42 is delivered to a load 43, $Z_{LOAD}$. The output current signal $I_{OUT}=I_{PIN}*N$ is the RSSI signal produced by the RSSI circuit 30.

The variable impedance device of the RSSI circuit 30 shown in FIG. 3 comprises resistors R1 32, R3 33 and PMOS M1 35. The control signal that is applied to control circuit 34 activates or deactivates the PMOSs M1 35 and M2 36, depending on the value of the control signal. In accordance with an illustrative embodiment, the control signal is based on the value of the voltage signal on line 47 at the positive, or non-inverting, terminal of the op-amp 41. The control signal may instead be based on, for example, the value of the voltage signal on line 46 at the negative, or inverting, terminal of the op-amp 41, the RSSI signal itself ($I_{PIN}*N$), or the data signal output from the TIA 48. The anode of a photodiode 45 is electrically coupled to an input of the TIA 48 and the cathode of the photodiode 45 is electrically coupled to the resistor R1 32 and to the non-inverting terminal of op-amp 41. Because the TIA 48 is a conventional circuit of an optical receiver, it will not be described herein in the interest of brevity.

When the photodiode 45 is detecting low optical input powers, the control signal will have a low value, which will cause the gate voltages of the PMOSs M1 35 and M2 36 to be large, thereby forcing the PMOSs M1 35 and M2 36 to have relatively high impedances, or be in their "off" states. When the PIN diode 45 is detecting high optical input powers, the control signal will have a high value, which forces the PMOSs M1 35 and M2 36 to have relatively low impedances, or be in their "On" states. The different voltages on the gate of PMOS M1 35 provide different parallel impedances to resistor R3 33 that change the effective impedance of the network of devices connecting the cathode of photodiode 45 to the RSSI supply voltage, $V_{CC}$. In this way, the impedance of the supply voltage filter circuit is varied based on the value of the RSSI signal.

It should be noted that the RSSI circuit 30 could operate without the fixed resistor R1 32. The variable impedance provided by the parallel arrangement of resistor R3 33 and PMOS M1 35 is able to achieve the goals described above without resistor R1 32 if resistor R3 33 and PMOS M1 35 are suitably selected. However, because the resistor R1 32 can be produced with a smaller parasitic capacitance than most devices, including R1 32 in the RSSI circuit 30 ensures higher filtering effectiveness at higher frequencies. The network comprising resistors R2 37 and R4 38 and PMOS M2 36 should match the network comprising resistors R1 32 and R3 33 and PMOS M1 35. Therefore, if resistor R1 32 is eliminated, resistor R2 37 should also be eliminated.

In an experiment conducted with an RSSI circuit having the configuration shown in FIG. 3, a value for resistor R3 33 of 5000 ohms and a value for resistor R1 32 of 100 ohms were chosen. At an average input current of 1.0 µA, PMOS M1 35 was in the Off state and the resulting voltage across the networks was 5.1 mV, which is a significant improvement over the 0.1 mV voltage across the network for the known RSSI circuit described above with reference to FIG. 1 when using similar resistor values for R1. At higher input currents, PMOS s M1 35 and M2 36 will have very low gate voltages and therefore very low impedances such that the overall network impedance will be only slightly larger than 100 ohms. If 100 ohms at high power is mandatory, the resistors and transistors of the circuit 30 can be easily scaled to meet the requirement.

Figure 4:
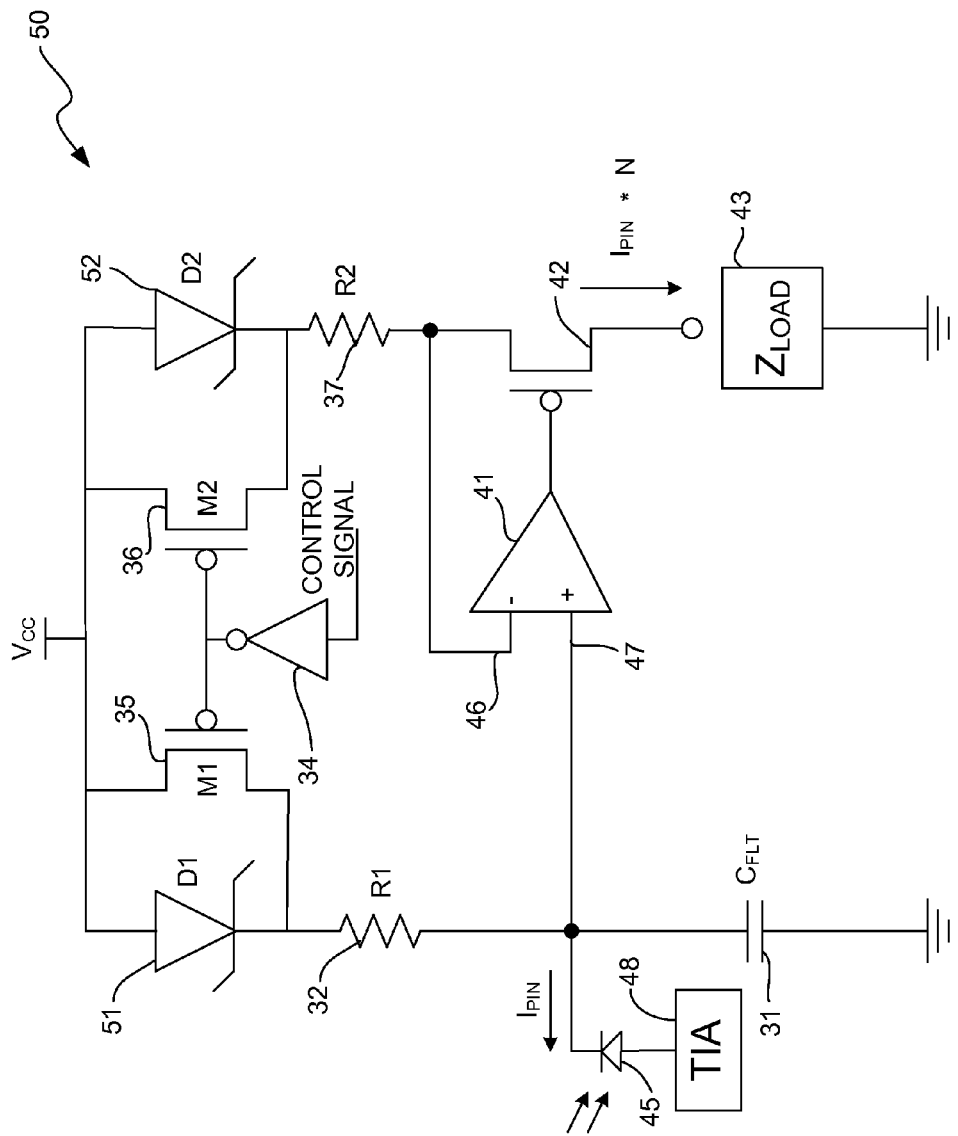
FIG. 4 illustrates a block diagram of an RSSI circuit in accordance with another illustrative embodiment.

FIG. 4 illustrates an RSSI circuit 50 in accordance with another illustrative embodiment. The RSSI circuit 50 is identical to the RSSI circuit 30 shown in FIG. 3 except that the resistors R3 33 and R4 38 shown in FIG. 3 have been replaced by first and second Schottky diodes D1 51 and D2 52, respectively, in FIG. 4. The supply voltage filter circuit of the RSSI circuit 50 comprises capacitor $C_{FLT}$ 31, resistors R1 32, diode D1 51, and a first PMOS M1 35. The control circuit 34 controls the activation and deactivation of the first and second PMOSs M1 35 and M2 36. The network comprising PMOS M2 36, resistor R2 37 and diode D2 52 is a scaled replica of the network comprising PMOS M1 35 and resistor R1 32 and diode D1 51. In the RSSI circuit 50, R1/R2=(Area of D2)/(Area of D1)=(W/L of M2)/(W/L of M1)=N, and therefore the overall impedance of the replica network is scalable by a factor of 1/N. The op-amp 41 and the PMOS 42 force the same voltage drop across both of the networks. Hence, the resulting output current signal, $I_{OUT}$, will be equal to $I_{PIN}*N$. The current that passes into and out of the PMOS 42 is delivered to a load 43, $Z_{LOAD}$. The output current signal $I_{OUT}=I_{PIN}*N$ is the RSSI signal produced by the RSSI circuit 50.

The variable impedance device of the RSSI circuit 50 shown in FIG. 4 comprises resistor R1 32, diode D1 51 and PMOS M1 35. The control signal that is applied to control circuit 34 activates or deactivates the PMOSs M1 35 and M2 36, depending on the control signal value. In accordance with an illustrative embodiment, the control signal is based on the value of the voltage signal on line 47 at the positive terminal of the op-amp 41. The control signal may instead be based on, for example, the value of the voltage signal on line 46 at the negative terminal of the op-amp 41, the RSSI signal itself ($I_{PIN}*N$), or the data signal output from the TIA circuit (not shown) of the receiver or transceiver module that incorporates the RSSI circuit 50.

When the photodiode 45 is detecting low optical input powers, the control signal will have a low value, which will cause the gate voltages of the PMOSs M1 35 and M2 36 to be large, thereby forcing the PMOSs M1 35 and M2 36 into high impedance states. When the PIN diode 45 is detecting high optical input powers, the control signal will have a high value, which forces the PMOSs M1 35 and M2 36 into low impedance states. In addition, the diodes D1 51 and D2 52 have impedances that scale down naturally with increased current and that scale up naturally with decreased current. In this way, the impedance of the supply voltage filter circuit is varied based on the value of the RSSI signal. Because of the manner in which the diodes D1 51 and D2 52 naturally change their impedance values as the current changes, the RSSI circuit 50 can operate effectively in certain cases without the PMOSs M1 35, M2 36 and the control circuit 34. Therefore, in some embodiments, the PMOSs M1 35 and M2 36 and the control circuit 34 are eliminated.

It should be noted that the invention has been described with respect to illustrative embodiments for the purposes of demonstrating the principles and concepts of the invention. The invention is not limited to these embodiments, as will be understood by persons of skill in the art. For example, while the invention has been described with reference to particular supply voltage filtering circuits having variable impedances, the principles and concepts of the invention can be achieved using a variety of RSSI circuit configurations, as will be understood by those skilled in the art in view of the description being provided herein. Many modifications may be made to the embodiments described herein while still achieving the goals of the invention, and all such modifications are within the scope of the invention.

What is claimed is:

1. An optical receiver signal strength indicator (RSSI) circuit for use in an optical receiver or transceiver module, the RSSI circuit comprising:
a supply voltage filter circuit being configured to act as a filter that removes noise of a predetermined frequency range from a supply voltage of the RSSI circuit, the supply voltage filter circuit being electrically coupled to the supply voltage of the RSSI circuit, the supply voltage filter circuit comprising a first variable impedance device, wherein an impedance value of the variable impedance device is increased when an input current signal to the RSSI circuit is weak and is decreased when the input current signal is strong, the input current signal being produced by an optical detector that is electrically coupled to an input terminal of the RSSI circuit, the input current signal being a current signal produced by the optical detector in response to light striking the optical detector.

2. The RSSI circuit of claim 1, wherein the supply voltage filter circuit further comprises:
at least a first resistor having a fixed value and a first capacitor having a capacitance, the first resistor and the first capacitor being electrically coupled to one another and to the input terminal of the RSSI circuit, the first resistor being electrically coupled to the variable impedance device.

3. The RSSI circuit of claim 2, further comprising:
an operational amplifier (op-amp) having a non-inverting terminal, an inverting terminal, and an output terminal, the non-inverting terminal being electrically coupled to the input terminal of the RSSI circuit.

4. The RSSI circuit of claim 3, further comprising:
a second resistor electrically coupled to the inverting terminal of the op-amp;
a second variable impedance device electrically coupled to the supply voltage and to the second resistor, the second variable impedance device being a scaled replica of the first variable impedance device; and
a first transistor having a first terminal, a second terminal and a third terminal, the first terminal of the first transistor being electrically coupled to the output terminal of the op-amp, the second terminal of the first transistor being electrically coupled to the second resistor and to the inverting terminal of the op-amp.

5. The RSSI circuit of claim 4, wherein the first variable impedance device comprises a third resistor and a second transistor that are connected in parallel to one another, and wherein the second variable impedance device comprises a fourth resistor and a third transistor that are connected in parallel to one another, the RSSI circuit further comprising:
control circuitry electrically coupled to the second and third transistors, the control circuitry receiving a control signal at an input terminal thereof and outputting a signal at an output terminal thereof that controls respective impedances of the second and third transistors to vary the respective impedances of the first and second variable impedance devices.

6. The RSSI circuit of claim 5, wherein the first, second and third transistors are P-type Metal Oxide Semiconductor Transistors (PMOSs), and wherein the control circuitry comprises an inverting control circuit that activates the second and third transistors when the control signal is large and that deactivates the second and third transistors when the control signal is small, wherein when the second and third transistors are deactivated, the second and third transistors are in relatively high-impedance states and wherein when the second and third transistors are activated, the second and third transistors are in relatively low-impedance states.

7. The RSSI circuit of claim 5, wherein the control signal is based on or derived from a voltage signal applied to the non-inverting terminal of the op-amp.

8. The RSSI circuit of claim 5, wherein the control signal is based on or derived from a voltage signal applied to the inverting terminal of the op-amp.

9. The RSSI circuit of claim 5, wherein the control signal is based on or derived from an RSSI output signal of the RSSI circuit.

10. The RSSI circuit of claim 5, wherein the control signal is based on or derived from other circuitry of the optical receiver or transceiver module that receives the current signal produced by the optical detector.

11. The RSSI circuit of claim 4, wherein the first variable impedance device comprises a first diode having an anode that is electrically coupled to the supply voltage and having a cathode that is electrically coupled to the first resistor, and wherein the second variable impedance device comprises a second diode having an anode that is electrically coupled to the supply voltage and having a cathode that is electrically coupled to the second resistor, and wherein the first and second diodes have respective impedances that increase as the input current signal decreases and that decrease as the input current signal increases.

12. The RSSI circuit of claim 11, wherein the first variable impedance device further comprises a second transistor connected in parallel with the first diode, and wherein the second variable impedance device comprises a third transistor connected in parallel with the second diode, the RSSI circuit further comprising:
   control circuitry electrically coupled to the second and third transistors, the control circuitry receiving a control signal at an input terminal thereof and outputting a signal that activates or deactivates the second and third transistors to vary the respective impedances of the first and second variable impedance devices.

13. The RSSI circuit of claim 12, wherein the first, second and third transistors are P-type Metal Oxide Semiconductor Transistors (PMOSs), and wherein the control circuitry comprises an inverting control circuit that activates the second and third transistors when the control signal is large and that deactivates the second and third transistors when the control signal is small, wherein when the second and third transistors are deactivated, the second and third transistors are in relatively high-impedance states and wherein when the second and third transistors are activated, the second and third transistors are in relatively low-impedance states.

14. The RSSI circuit of claim 12, wherein the control signal is based on or derived from a voltage signal applied to the non-inverting terminal of the op-amp.

15. The RSSI circuit of claim 12, wherein the control signal is based on or derived from a voltage signal applied to the inverting terminal of the op-amp.

16. The RSSI circuit of claim 12, wherein the control signal is based on or derived from an RSSI output signal of the RSSI circuit.

17. The RSSI circuit of claim 12, wherein the control signal is based on or derived from other circuitry of the optical receiver or transceiver module that receives the current signal produced by the optical detector.

18. An optical receiver signal strength indicator (RSSI) circuit for use in an optical receiver or transceiver module, the RSSI circuit comprising:
   a supply voltage filter circuit electrically coupled to a supply voltage of the RSSI circuit and to an input terminal of the RSSI circuit, the supply voltage filter circuit comprising a first variable impedance device;
   a second variable impedance device that is a scaled replica of the first variable impedance device, the second variable impedance device being electrically coupled to the supply voltage;
   an operational amplifier (op-amp) having a non-inverting terminal, an inverting terminal, and an output terminal, the non-inverting terminal being electrically coupled to the input terminal of the RSSI circuit, the inverting terminal of the op-amp being electrically coupled to the second variable impedance device; and
   control circuitry electrically coupled to the first and second variable impedance devices, the control circuitry being configured to selectively vary an impedance value of at least the first variable impedance device based on a strength or weakness of an input current signal to the RSSI circuit, the input current signal being produced by an optical detector that is electrically coupled to the input terminal of the RSSI circuit.

19. The RSSI circuit of claim 18, wherein the control circuitry increases the impedance value of the first variable impedance device when an input current signal to the RSSI circuit is weak and decreases the impedance value of the first variable impedance device when the input current signal to the RSSI circuit is strong.

20. A method for use in an optical receiver signal strength indicator (RSSI) circuit of an optical receiver or transceiver module, the method comprising:
   detecting a strength or weakness of an input current signal received at an input terminal of the RSSI circuit, the input current corresponding to a current signal produced by an optical detector that is electrically coupled to the input terminal; and
   based on the detected strength or weakness of the input current signal, varying an impedance value of a variable impedance device of a supply voltage filter circuit of the RSSI circuit, the supply voltage filter circuit acting as a filter that removes noise of a predetermined frequency range from a supply voltage of the RSSI circuit, the supply voltage filter circuit being electrically coupled to the supply voltage of the RSSI circuit.

21. The method of claim 20, wherein the impedance value of the variable impedance device is increased when the detected strength of the input current signal is weak and is decreased when the detected strength of the input current signal is strong.

* * * * *